(12) United States Patent
Brinks

(10) Patent No.: US 7,506,858 B2
(45) Date of Patent: Mar. 24, 2009

(54) TUBE-END BUTTERFLY METERING AND SHUTOFF VALVE

(75) Inventor: Barry T. Brinks, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 274 days.

(21) Appl. No.: 11/676,046

(22) Filed: Feb. 16, 2007

(65) Prior Publication Data

US 2008/0197312 A1  Aug. 21, 2008

(51) Int. Cl.
*F16K 1/18* (2006.01)
(52) U.S. Cl. .................. 251/304; 251/308; 251/314
(58) Field of Classification Search .......... 251/304, 251/305, 308, 315.01, 315.16, 314, 160, 251/192

See application file for complete search history.

(56) References Cited

U.S. PATENT DOCUMENTS

| | | | | |
|---|---|---|---|---|
| 3,033,513 A | * | 5/1962 | Vulliez | 251/163 |
| 3,284,046 A | * | 11/1966 | Allenbaugh, Jr. | 251/315.16 |
| 3,675,894 A | * | 7/1972 | Friedell | 251/308 |
| 3,937,441 A | * | 2/1976 | Baumann | 251/315.16 |
| 4,482,128 A | * | 11/1984 | Boeckman et al. | 251/308 |
| 4,634,098 A | * | 1/1987 | Varden | 251/315.16 |
| 4,667,929 A | * | 5/1987 | Narduzzi | 251/315.16 |
| 4,718,444 A | | 1/1988 | Boelte | |
| 4,768,750 A | * | 9/1988 | Wilson | 251/308 |
| 5,118,078 A | | 6/1992 | Younker | |
| 5,494,028 A | | 2/1996 | DeVries et al. | |
| 2002/0109118 A1 | | 8/2002 | Brinks | |
| 2004/0149952 A1 | | 8/2004 | DePenning et al. | |
| 2005/0224743 A1 | | 10/2005 | Boardman et al. | |

* cited by examiner

*Primary Examiner*—John Bastianelli
(74) *Attorney, Agent, or Firm*—Reinhart Boerner Van Deuren P.C.

(57) ABSTRACT

A butterfly valve comprising a valve body having a passage, a valve shaft assembly, a plate, and a tube is provided. The valve shaft assembly comprises first and second shaft portions in opposing spaced relation, an intermediate portion therebetween, and a support plate secured to the valve shaft assembly. The first and second shaft portions rotatably couple the valve shaft assembly to the valve body. The intermediate member forms a chamber in fluidic communication with the passage. The support plate is disposed within the chamber at a closed valve position approximately perpendicular to a direction of fluid flow through the passage. The plate is secured to the support plate and has an inner portion and a flange radially outward of the inner portion. The flange is directed away from the support plate. The tube is disposed within the passage and friction or clearance fit over a portion of the flange.

34 Claims, 10 Drawing Sheets

TUBE-END BUTTERFLY METERING AND SHUTOFF VALVE

FIELD OF THE INVENTION

This invention generally relates to valves and, in particular, to butterfly valves.

BACKGROUND

A conventional butterfly valve is a type of flow control device used to manage a flow of fluid through a section of pipe. The typical butterfly valve includes a hollow cylindrical housing, a flat, circular plate, and a rotatable shaft. The plate is disposed within the housing at a point intermediate to the length of the cylindrical housing and secured to a lower portion of the rotatable shaft. An upper portion of the rotatable shaft is coupled to an actuator. During operation, movement of the actuator is translated to the plate. As the actuator moves, the plate is rotatably positioned within the housing anywhere from perpendicular to parallel to the direction of the flow of fluid through the valve. When the plate is perpendicular to the fluid flow direction, the valve is closed and the fluid is restricted from flowing through the valve. In contrast, when the plate is parallel to the fluid flow direction, the valve is fully open and the fluid flow through the valve is at its maximum. By moving the plate between perpendicular and parallel positions, the valve can be partially opened to provide metered fluid flows.

Conventional butterfly valves either have a clearance fit between the plate and the flow path to avoid wear, which results in high leakage rates, or have contact between the plate and the flow path. Since the radial stiffness of both the plate and the housing are high, a butterfly valve with too low a clearance fit may require high actuation forces and risks jamming and/or high wear rates at any contacting points. The high wear rates of the contacting surfaces result in undesirable leakage of the valve in the closed position. To replace a worn plate and prevent further leakage, the valve shaft is removed to provide access to the plate. Removing the valve shaft is often an arduous and time consuming task and, therefore, changing a worn plate can be a difficult and lengthy process.

Most butterfly valves, especially butterfly valves rated for high operating pressure, are also known to have somewhat lower flow rates (i.e., $C_v$ rates) compared to, for example, ball valves since the flow path is somewhat obstructed by the plate and the shaft. A low flow rate often requires a larger valve for a given application, which may not be practical in terms of cost, available space, and available actuation torque.

Moreover, standard butterfly valves sometimes require high actuation torque to move the plate, especially from a closed position to an open position. Such high actuation torque is due to, for example, high valve closed seating forces, metal galling between the plate and the housing, a high spring preload needed to bias the valve to the closed position upon a loss of actuator power, high flow induced torque, and the like. As a result of requiring high actuation torque, larger and more costly actuators must be employed to open and close the valve.

A standard butterfly valve has the flow passage extending beyond the plate in both directions. Hence, the geometry modifications to the plate and shaft assembly in order to reduce flow induced torque are limited to locations inside the flow passage diameter when the valve is at any position. These modifications provide only minimal reduction of flow induced torque and may reduce the flow area of the fully open valve.

BRIEF SUMMARY

Thus, it can be seen that a butterfly valve that resists wear and leakage, provides an exemplary flow rate for its size and dimensions in both forward and reverse flow directions, and requires a low actuation torque to move between open and closed positions would be desirable. The invention provides such a butterfly valve. Advantages of the invention, as well as additional inventive features, will be apparent from the description of the invention provided herein.

In one aspect, the butterfly valve has a valve body having a passage, a valve shaft assembly, a plate, and a tube. The valve shaft assembly comprises a first shaft portion and a second shaft portion in opposing spaced relation, an intermediate portion between the first shaft portion and the second shaft portion, and a support plate secured to the valve shaft assembly. The first and second shaft portions rotatably couple the valve shaft assembly to the valve body. The intermediate member forms a chamber in fluidic communication with the passage. The support plate is disposed within the chamber at a closed valve position approximately perpendicular to a direction of fluid flow through the passage. The plate is secured to the support plate. The plate has a flat inner portion and a flange radially outward of the inner portion. The flange is directed away from the support plate. The tube is disposed within the passage starting at an attachment to the housing at one end of the valve flow passage in a spaced relation to the shaft and extending to a location near the centerline of the shaft assembly where the tube is friction fit or clearance fit over a portion of the plate flange.

In another aspect, the butterfly valve comprises a valve body, a valve bonnet, a valve shaft assembly, a plate, and a tube. The valve body forms a passage, a valve bonnet aperture, and a recess. The valve bonnet aperture is transverse to the passage and in opposing spaced relation with the recess. The valve bonnet is disposed in the valve bonnet aperture and includes a shaft aperture. The shaft aperture is axially-aligned with the recess. The valve shaft assembly includes a first shaft portion and a second shaft portion in opposing spaced relation, an intermediate member, and a support plate. The first shaft portion rotatably extends into the shaft aperture and the second shaft portion is rotatably situated within the recess. The intermediate member is disposed between the first and second shaft portions and has a chamber passing therethrough. The support plate is disposed within the chamber at a closed valve position approximately perpendicular to a direction of fluid flow through the passage. The plate is secured to the support plate. The plate has a flat inner portion and a flange radially outward of the flat inner portion. The flange is directed away from the support plate. The tube is disposed within the passage, friction fit with or fastened to the passage, and friction fit over at least a portion of the flange. As such, a rounded portion of the support plate and a corresponding portion of the plate are rotatable into the tube to place the valve in an open position and rotatable out of the tube to place the valve in a closed position.

In yet another aspect, a butterfly valve shaft assembly is provided for use with a ball valve housing. The butterfly valve shaft assembly comprises a first shaft portion, a second shaft portion, an intermediate member, a support plate, and a plate. The second shaft portion is in opposing spaced relation with the first shaft portion. The intermediate member is between the first and second shaft portions and has a chamber passing therethrough. The support plate is disposed within the chamber at a closed valve position approximately perpendicular to a direction of fluid flow through the passage. The plate is secured to the support plate. The plate has a flat inner portion and a flange radially outward of the inner portion. The flange is directed away from the support plate.

Other aspects, objectives and advantages will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

The butterfly valve described herein is able to resist wear and leakage, provides an exemplary flow rate for its size and dimensions in both forward and reverse flow directions, and requires a low actuation torque to move between open and closed positions.

Figure 1:
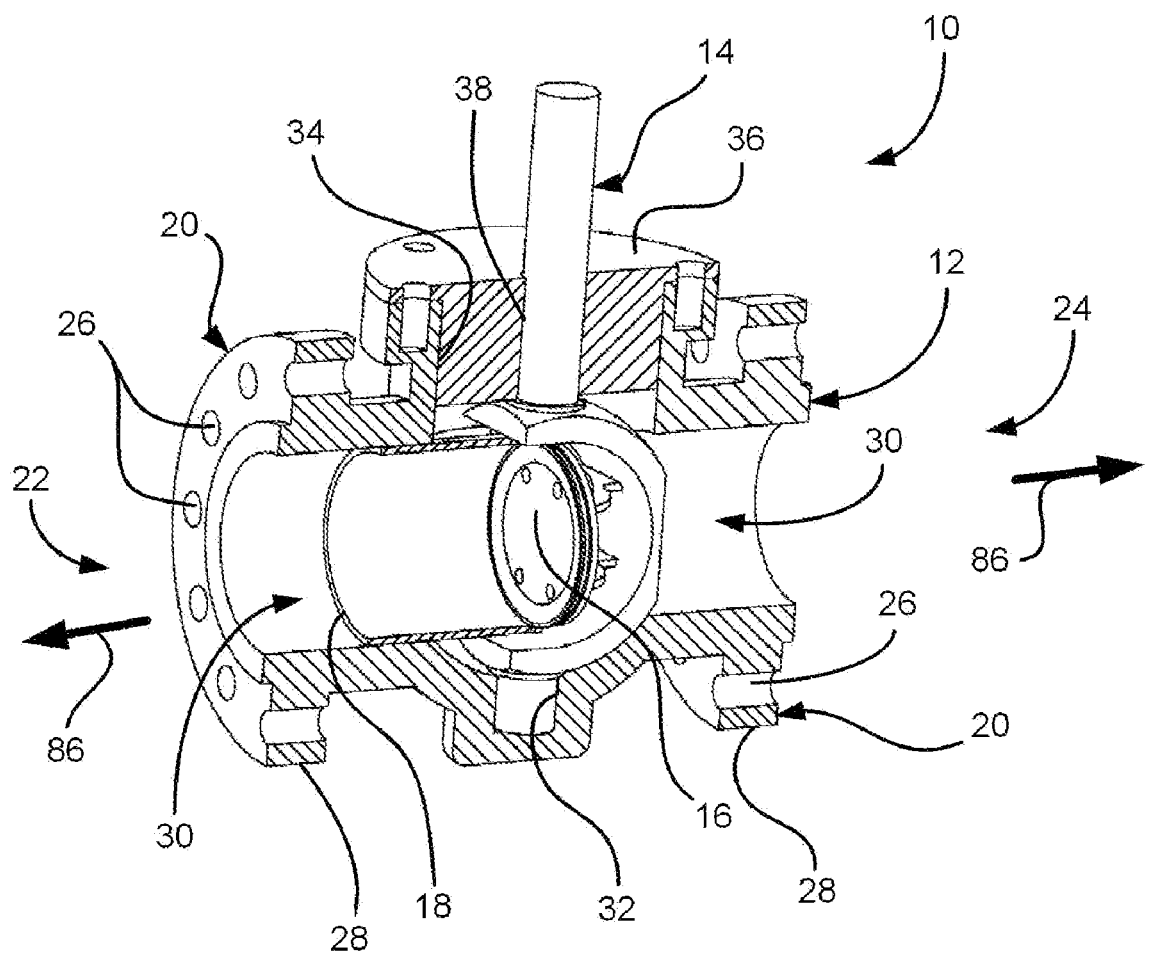
FIG. 1 is a partially cut-away, side perspective view of an exemplary embodiment of a butterfly valve constructed in accordance with the teachings of the present invention.
Figure 2:
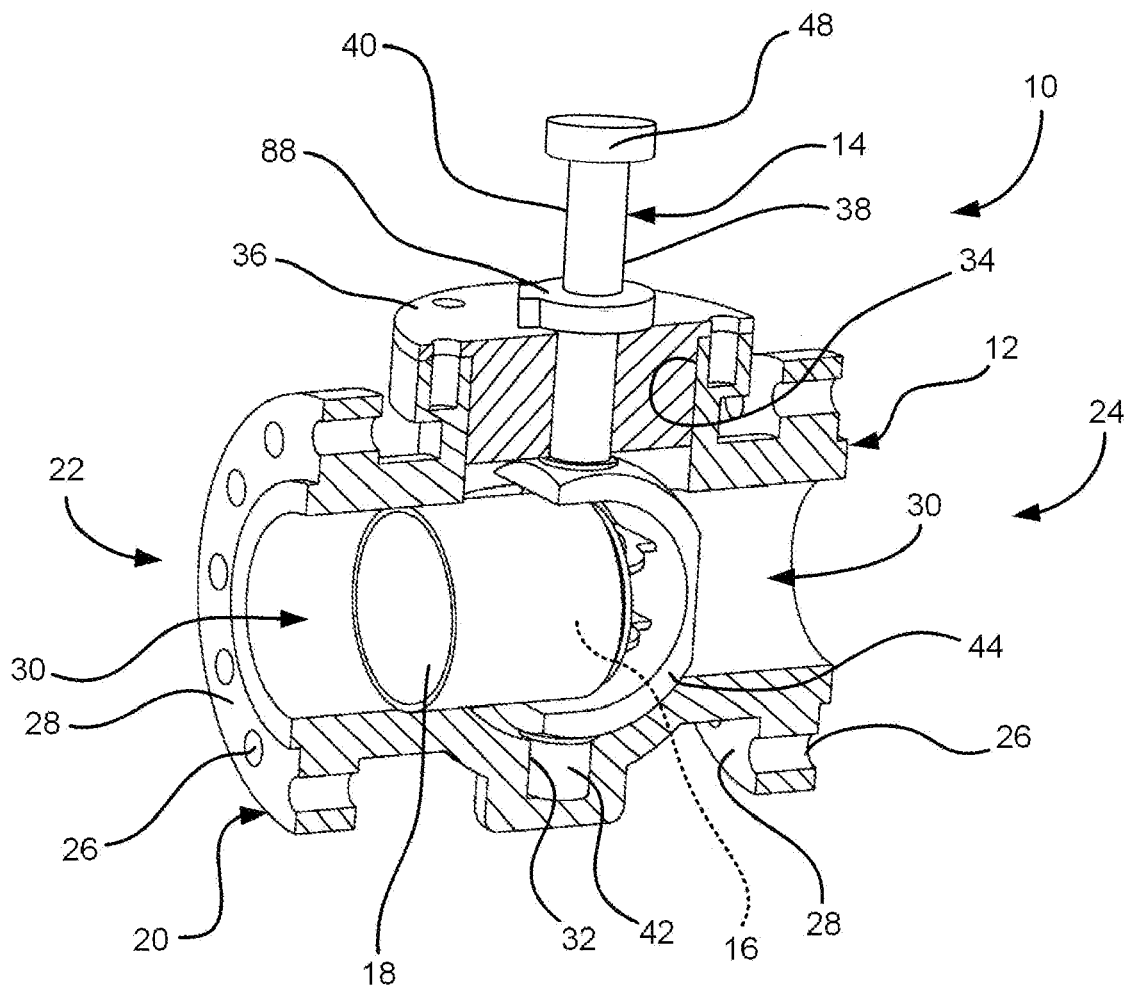
FIG. 2 is another partially cut-away, side perspective view of the butterfly valve of FIG. 1 with the butterfly valve in a closed position.

Referring to FIGS. 1 and 2, the butterfly valve 10 comprises a valve body 12, a valve shaft assembly 14, a plate 16, and a tube 18. The valve body 12 is preferably formed of a high strength, generally fluid impervious material such as, for example, stainless steel, alloy steel, aluminum, plastic, polyvinyl chloride (PVC), and the like. In various embodiments, the valve body 12 is one of a wafer housing, a lug housing, a flanged housing, and a double flanged housing.

As shown in FIG. 1, the valve body 12 includes a pipe coupling member 20 on a first end 22 of the butterfly valve 10 and another pipe coupling member 20 on a second end 24. The pipe coupling members 20 generally permit the valve body 12 of the butterfly valve 10 to be secured to and/or placed in line with a pipe (not shown). As illustrated, the pipe coupling members 20 include a plurality of apertures 26 circumferentially spaced around and formed through a radial flange 28. The pipe coupling members 20 are preferably integrally formed with the valve body 12. Those skilled in the art will recognize that that a variety of other means and methods of attaching the valve body 12 to the pipe can be used.

Still referring to FIG. 1, the valve body 12 defines and includes a passage 30. In the illustrated embodiment, the passage 30 is a generally cylindrical passage that travels through the valve body 12 and extends from the first end 22 to the second end 24 of the butterfly valve 10. The passage 30 is configured to accommodate a flow of a fluid therethrough. Depending on the particular application of the butterfly valve 10, the fluid can be a gas, a liquid, or a mixture thereof. Such gases and liquids can include, for example, gaseous fuel, liquid fuel, water, and the like.

The valve body 12 also includes a recess 32 and a valve bonnet aperture 34. The recess 32 is generally a cylindrical cavity formed in the valve body 12. The recess 32 and the valve bonnet aperture 34 are generally transverse to the passage 30 and are in opposing spaced relation with each other. The valve bonnet aperture 34 passes through the valve body 12 and, as a result, is generally occupied by and/or filled with a valve bonnet 36. The valve bonnet 36 can be secured within the valve bonnet aperture 34 using, for example, threaded members. The valve bonnet 36 includes a shaft aperture 38 that is generally transverse to the passage 30 and axially-aligned with the recess 32.

Figure 3:
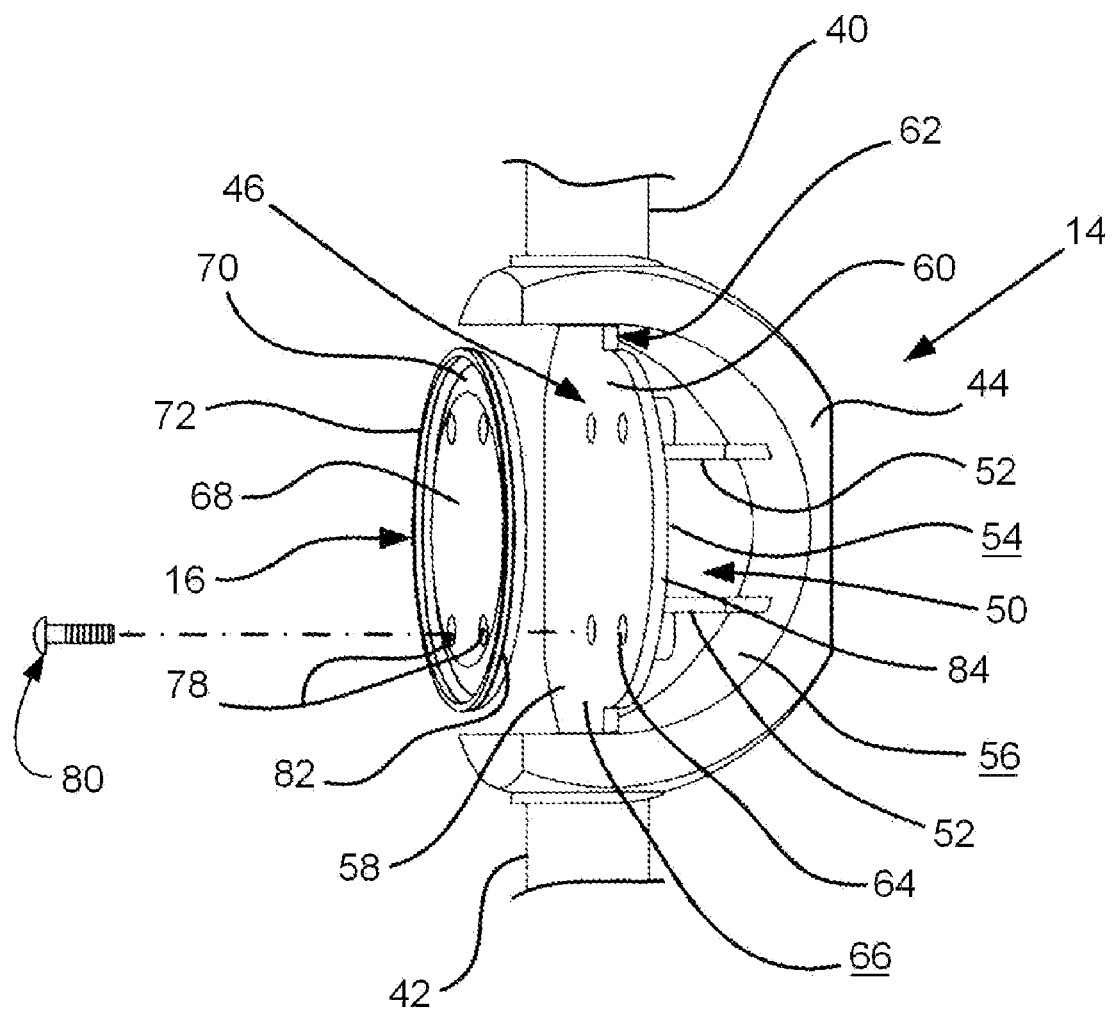
FIG. 3 is an exploded view of a shaft assembly and a plate configured for use in the butterfly valve of FIG. 1.

As best shown in FIG. 3, the valve shaft assembly 14 includes a first shaft portion 40, a second shaft portion 42, an intermediate member 44, and a support plate 46. The first and second shaft portions 40, 42 are in opposing spaced relation and generally axially-aligned with each other. Referring back to FIGS. 1 and 2, the first shaft portion 40 extends into the shaft aperture 38 in the valve bonnet 36 while the second shaft portion 42 is situated within the recess 32. A thin-wall, hollow, cylindrical sleeve bearing (not shown) is typically fitted over one or both of the first and second shaft portions 40, 42 such that the bearing is interposed between the shaft portion(s) and the valve body 12. The first and second shaft portions 40, 42 are operably engaged with the shaft aperture 38 and the recess 32, respectfully, such that the valve shaft assembly 14 can rotate relative to the valve body 12 and the passage 30. In that regard, the first shaft portion 40 can be operably coupled to an actuator 48. The actuator 48 can be, for example, a handle, an electrical motor drive actuator, a pneumatic actuator, and the like.

The intermediate member 44 is generally a C-shaped or a semi-spherical piece of material interposed between, and coupling together, the first and second shaft portions 40, 42. As shown in FIG. 1, the intermediate member 44 resembles a portion of a ball similar to, but not the same as, that found in a typical ball valve. The intermediate member 44 is preferably integrally formed with the first and second shaft portions 40, 42. The intermediate member 44 rotates within the valve body 12 in conjunction with rotation of the first and second shaft portions 40, 42. As illustrated in FIG. 3, the intermediate member 44 forms a chamber 50 within the shaft assembly 14. The chamber 50 is generally in fluidic communication with the passage 30.

Still referring to FIG. 3, the support plate 46 is shown nestled within the chamber 50 in the intermediate member 44. In such a configuration, the support plate 46 is generally oriented between the first and second shaft portions 40, 42. The support plate 46 is preferably coupled to the intermediate member 44 proximate the first and second shaft portions 40, 42. In one embodiment, the support plate 46 is supported by one or more support webs 52. The support webs 52 extend between a back side 54 of the support plate 46 and a front face 56 of the intermediate member 44 to provide structural support. Preferably, the support plate 46 and the support webs 52 are each integrally formed with the intermediate member 44.

As best shown in FIG. 3, the support plate 46 is a generally flat member having both an irregular shaped or polygon portion 58 and rounded portion 60. As illustrated, the polygon portion 58 extends vertically farther toward the first and second shaft portions 40, 42 than the rounded portion 60. In other words, the rounded portion 60 is somewhat truncated compared to the polygon portion 58 to form a slot area 62 in the valve shaft assembly 14. The support plate 46 includes a plurality of recesses 64 formed in a front side 66. The recesses 64 are preferably threaded such that they are able to receive and hold a threaded member (e.g., a bolt, a screw, etc.).

Figure 4:
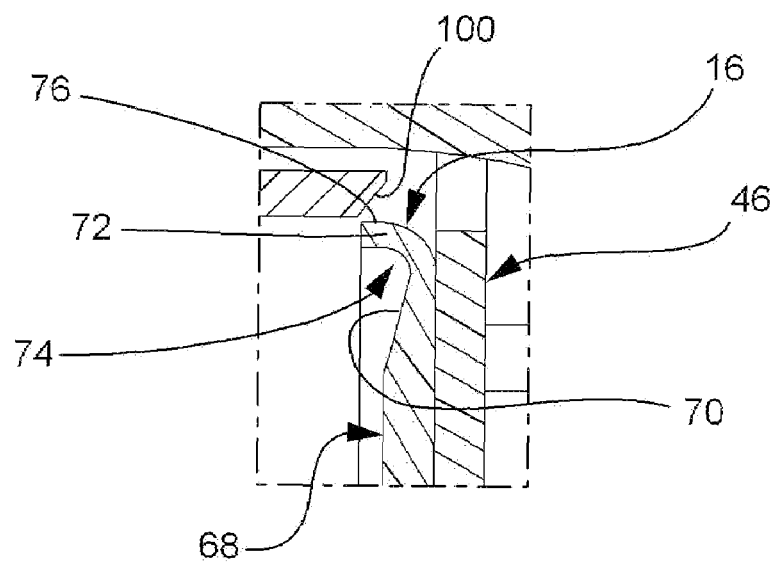
FIG. 4 is a cut-away view of a portion of the butterfly valve of FIG. 1 highlighting an engagement of a tube with a flange on the plate illustrated in FIG. 3.

The plate 16 is a generally circular member. As best shown in FIG. 4, the plate 16 has a flat inner portion 68, a tapered thickness section 70 radially outward of the flat inner portion, and a flange 72 radially outward of the tapered thickness section. As shown, the flange 72 is generally directed away from the support plate 46. The flange 72 may also be directed toward the support plate 46. The tapered thickness section 70 and the flange 72 together form a concave cavity 74. In one embodiment, the flange 72 includes a protuberance 76 that extends radially outwardly from the flange, extends circumferentially around the flange, and is generally coplanar with the centerlines of the first and second shaft portions 40, 42. In one embodiment, the protuberance 76 is formed from a compliant material such as, for example, Polytetrafluoroethylene (PTFE) or an elastomer. The flange 72 is preferably deflectable both radially inwardly and radially outwardly. In one embodiment, the plane of the outside diameter of the protuberance 76 is coplanar to the rotating centerline of the shaft assembly such that the shaft assembly centerline bisects the protuberance 76 diameter. The compliance of the tube can allow the shaft assembly centerline to be a very small distance from the plane of the protuberance 76 outside diameter. Additionally, the compliance of the tube can allow the shaft assembly centerline to be a very small distance from bisecting the protuberance 76 diameter. These offset dimensions can be used to change the torque induced by a pressure differential across the valve 10 at the fully closed position.

As shown in FIG. 3, the flat inner portion 68 of the plate 16 includes a plurality of apertures 78. The apertures 78 preferably align with the recesses 64 in the support plate 46. As such, threaded members 80 can be passed through the apertures 78 and threadably driven into the recesses 64 to secure the plate 16 to the support plate 46. When secured in this manner, the plate 16 is generally coaxial with the support plate 46. In one embodiment, the rounded portion of the support plate 46 generally has a radius that is smaller than a radius of the plate 16 (i.e., an outer periphery 82 of the plate 16 extends radially outwardly of an outer periphery 84 of the rounded portion of the support plate 46). Also, in one embodiment, the plate 16 and the support plate 46 (or other components of the valve shaft assembly 14) can be integrally formed with each other.

Referring back to FIGS. 1 and 2, the tube 18 is disposed within the passage 30 of the valve body 12. The tube 18 is generally a hollow, thin walled cylinder. As shown, the tube 18 starts near the centerline of the shaft assembly 14 and is directed and extends away from the plate 16 and the support plate 46 toward the first end 22 of the valve body 12. The tube 18 is friction fit (i.e., interference fit, press fit, etc.) with the passage 30 and/or fastened to the passage (e.g., integral with the valve body 12). In one embodiment, the tube 18 is installed in the passage 30 by retaining an outside facing flange integral to the tube on the end opposite the valve shaft assembly 14 using a hollow ring threaded on the outside diameter of the passage. In this manner, the tube 18 is secured within the passage 30 of the valve body 12. The tube 18 is also friction fit or clearance fit over at least a portion of the flange 72 and/or the protuberance 76. In one embodiment, the inside diameter of the tube at the end that is fit over at least a portion of the flange 72 and/or the protuberance 76 has a chamfer or radius 100 (see FIG. 4) added to facilitate flange 72 and/or protuberance 76 from moving past the end of the tube without damage.

Figure 5:
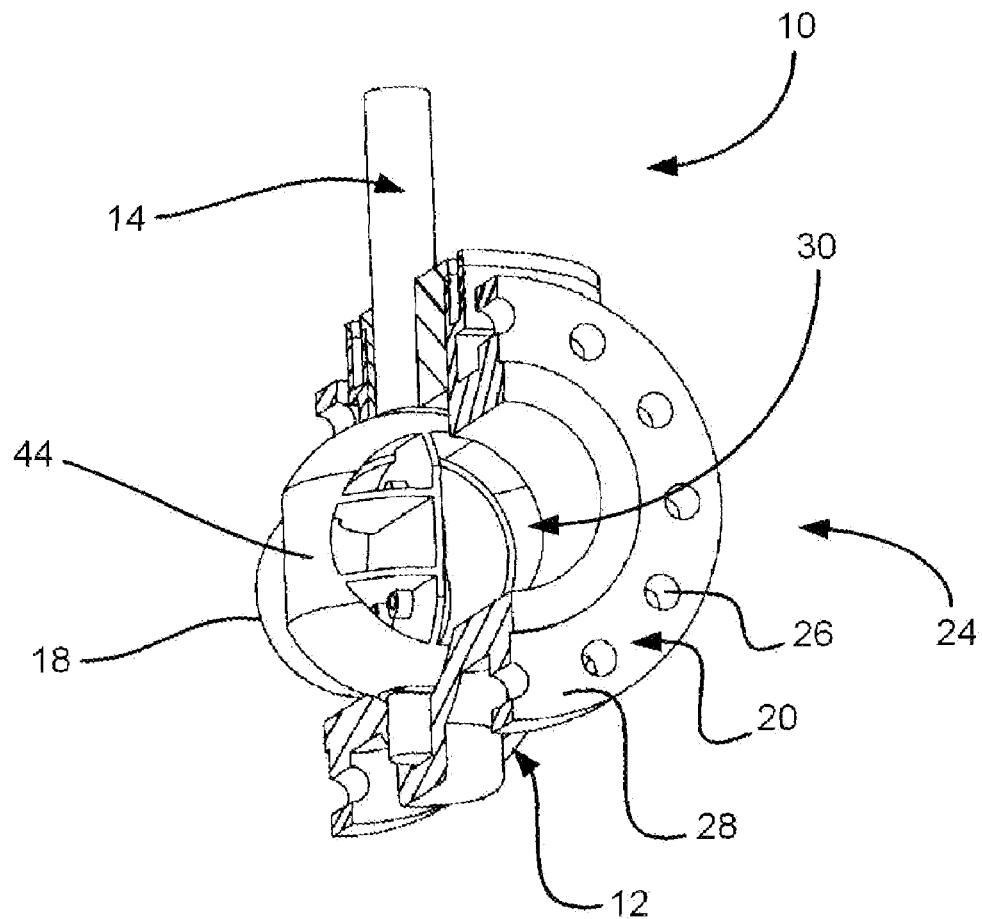
FIG. 5 is a partially cut-away rear perspective view of the butterfly valve of FIG. 1 with the butterfly valve in an open position.

The tube 18 (or at least a portion of the tube proximate the flange 72) is preferably deflectable (i.e., compliant) both radially inwardly and radially outwardly when the valve 10 is in the open position as shown in FIG. 5 or in the closed position as shown in FIG. 1. Therefore, with the valve 10 in the open position, the tube 18 is deflectable into an oval (e.g., elliptical) cross section transverse to a direction of fluid flow through the passage causing a reduction in the contact force between the flange 72 and/or protuberance 76 and the tube 18, the fluid flow direction being represented by directional arrows 86 in FIG. 1. Furthermore, with the valve 10 in the closed position, the tube 18 and the flange 72 and/or protuberance 76 both deflect in a radial direction in response to differential pressure across the valve. In an exemplary embodiment, the radial compliance of the tube 18 is equivalent to and/or matched with the radial compliance of the flange 72. As such, the two components are able to promote a constant seal contact pressure and require low actuation torque even as the differential pressure across the butterfly valve 10 change.

Because the tube 18 has the ability to deflect, certain benefits can be realized in various circumstances. For example, if the tube 18 is manufactured round and the valve 10 is partially or fully open, then the tube 18 and the flange 72 on the plate 16 can deflect into oval shapes and reduce the contact pressure and, therefore, reduce the wear rate. As a further example, the tube 18 can be manufactured in a slight elliptical or oval shape such that, when the valve 10 is open, the tube 18 will not contact the plate 16. However, when the valve 10 is closed, the tube 18 is forced into a circular shape to engage with the circular shaped plate 16 and the valve 10 seals just as well as when a round tube is employed.

Each of the plate 16 and tube 18 can be coated with an erosion and/or corrosion resistant material or compound such as, for example, flame-sprayed carbide coating, hard chrome plating, and the like. Such an erosion and/or a corrosion resistant substance, when applied to the plate 16 and/or tube 18, extends the useful life of the component. As a result, the plate 16 and the tube 18 need not be replaced as often as untreated plates and tubes.

As illustrated in FIG. 1, both the tube 18 and the plate 16 can be accessed via the first end 22 of the valve body 12. Therefore, should the tube 18 and/or the plate 16 need to be replaced, they can be easily taken out of the valve body 12 without having to remove the valve bonnet 36 from the valve body. For example, the pipe coupling 20 proximate the first end 22 can be disengaged from the pipe (not shown) to expose the tube 18 and the plate 16. The uncovered tube 18 can be extracted from the passage 30 by overcoming the friction fit and/or fastening components holding the tube in place. Thereafter, the threaded members 80 securing the plate 16 to the support plate 46 can be driven outwardly to disengage the two components. The uncoupled plate 16 can then also be pulled from the passage 30. With the worn component(s) removed, a new plate 16 can be secured to the support plate 46 with the threaded members 80 and a new tube 18, if needed, can be fit into the passage 30 and over the flange 72 and/or protuberance 76.

In operation, when the butterfly valve 10 is in the closed position as shown in FIG. 1, the plate 16 is generally oriented in the passage 30 such that the plate is perpendicular to a direction of fluid flow as represented by the directional arrows 86. In addition, the flange 72 preferably projects and extends into the tube 18 such that the protuberance 76 is inside and engaged with the tube. In this arrangement, the protuberance 76 is seated against the tube 18 to encourage a seal. In the closed position, the fluid is prevented and/or restricted from flowing through the passage 30.

Using the actuator 48, the butterfly valve 10 can be transitioned between the closed position and the open position, which is shown in FIG. 5. The actuator 48, which is coupled to the first shaft portion 40, is preferably rotated about equal to or slightly less than ninety degrees between the fully open and fully closed positions. Also, when the actuator 48 is a handle, the position of the handle indicates the status of the valve. For example, the handle can be set up such that when the handle is parallel to the valve body 12, the butterfly valve 10 is in the open position and when the handle is perpendicular to the valve body, the butterfly valve is in the closed position.

To place the valve in the fully open position, the rounded portion 60 of the support plate 46 and a corresponding portion of the plate 16 are rotated into the tube 18 using the actuator 48. Simultaneously, the intermediate member 44 is rotated out of the passage 30. As a result, the fluid is permitted to flow through the passage 30 in either the forward or reverse direction. Also, the plate 16, the support plate 46, and the support webs 52 are generally oriented parallel to the flow path with only the thickness of these few components providing a low cross sectional area blocking the flow path while the butterfly valve 10 is in the fully open position. As such, the pressure drop through the passage is minimal and the flow area of the butterfly remains high. Moreover, the high flow area exists in both a forward direction (from the first end 22 to the second end 24) and a reverse direction (from the second end to the first end). In one embodiment, the flow in the forward and reverse directions is approximately equivalent.

As the fluid flows through the passage 30 while the butterfly valve 10 is in the fully open position (or a partially open position), each of the tube 18 and the flange 72 are able to deflect radially inwardly and radially outwardly to respond to the various pressures and forces present in the butterfly valve 10. As previously indicated, if the tube 18 is manufactured round and the valve 10 is partially or fully open, then the tube 18 and the flange 72 on the plate 16 can deflect into oval shapes and reduce the contact pressure and, therefore, reduce the wear rate. Similarly, if the tube 18 is manufactured in a slight elliptical or oval shape, when the valve 10 is open the tube 18 will not contact the plate 16 and, when the valve 10 is closed, the tube 18 is forced into a circular shape to engage with the circular shaped plate 16. Therefore, the valve 10 seals just as well as when a round tube is employed. This results in the butterfly valve 10 being able to more efficiently meter the fluid.

In one embodiment, the first shaft portion 40 of the valve shaft assembly 14 is operably coupled to a biasing member 88. The biasing member 88 is represented in simplified form in FIG. 2. While shown above the valve bonnet 36 in FIG. 2, the biasing member 88 may be positioned anywhere along, and integrally formed with, the valve shaft assembly 14. The biasing member 88 is a device that provides a biasing force to the valve shaft assembly 88 such that the butterfly valve 10 is urged toward the closed position in particular circumstances. In one embodiment, the biasing member 88 (e.g., a spring) is preloaded to act as a fail-safe device for the butterfly valve 10. If a loss of power at the actuator 48 occurs, the biasing member 88 forces the butterfly valve 10 into the closed position to restrict the flow of fluid through the passage 30. Alternatively, the biasing member 88 urges the butterfly valve 10 to the full open position.

Figure 6:
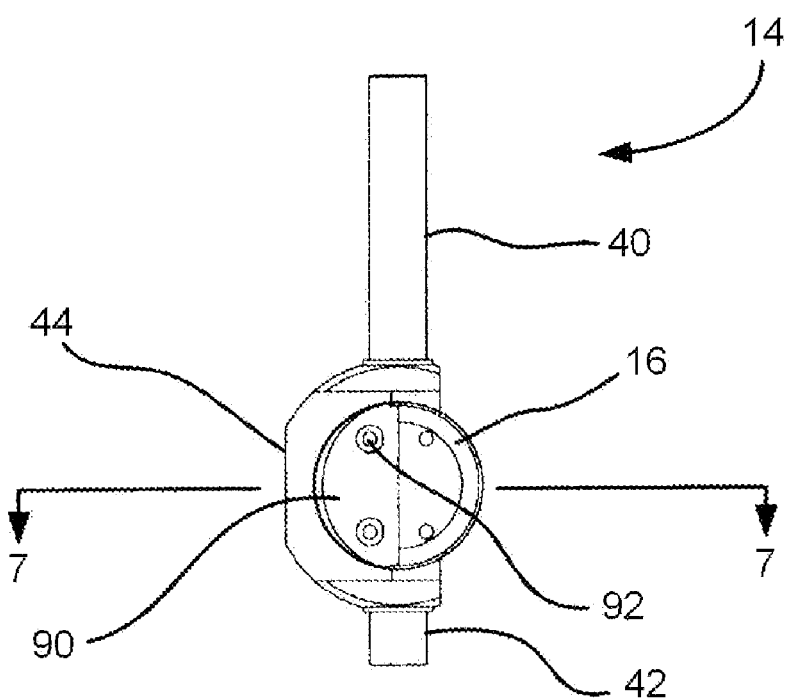
FIG. 6 is a side elevation view of the shaft assembly and the plate of FIG. 3 where a wedge or step is engaged with the plate and secured to the shaft assembly in accordance with the teachings of the invention.
Figure 7:
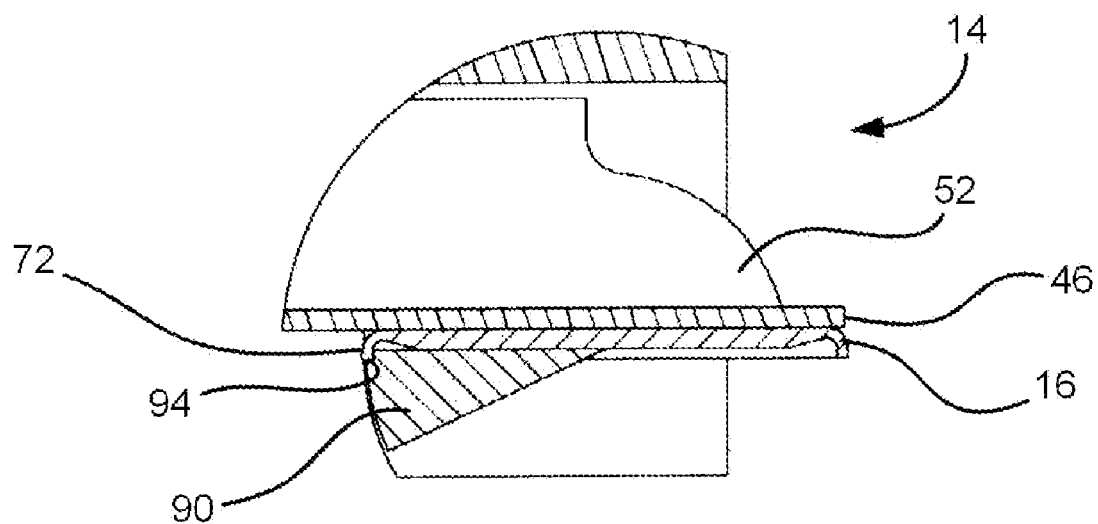
FIG. 7 is a top cross section view of the shaft assembly of FIG. 6, taken generally along line 7-7, illustrating the orientation of the wedge or step relative to the shaft assembly and the plate.
Figure 8:
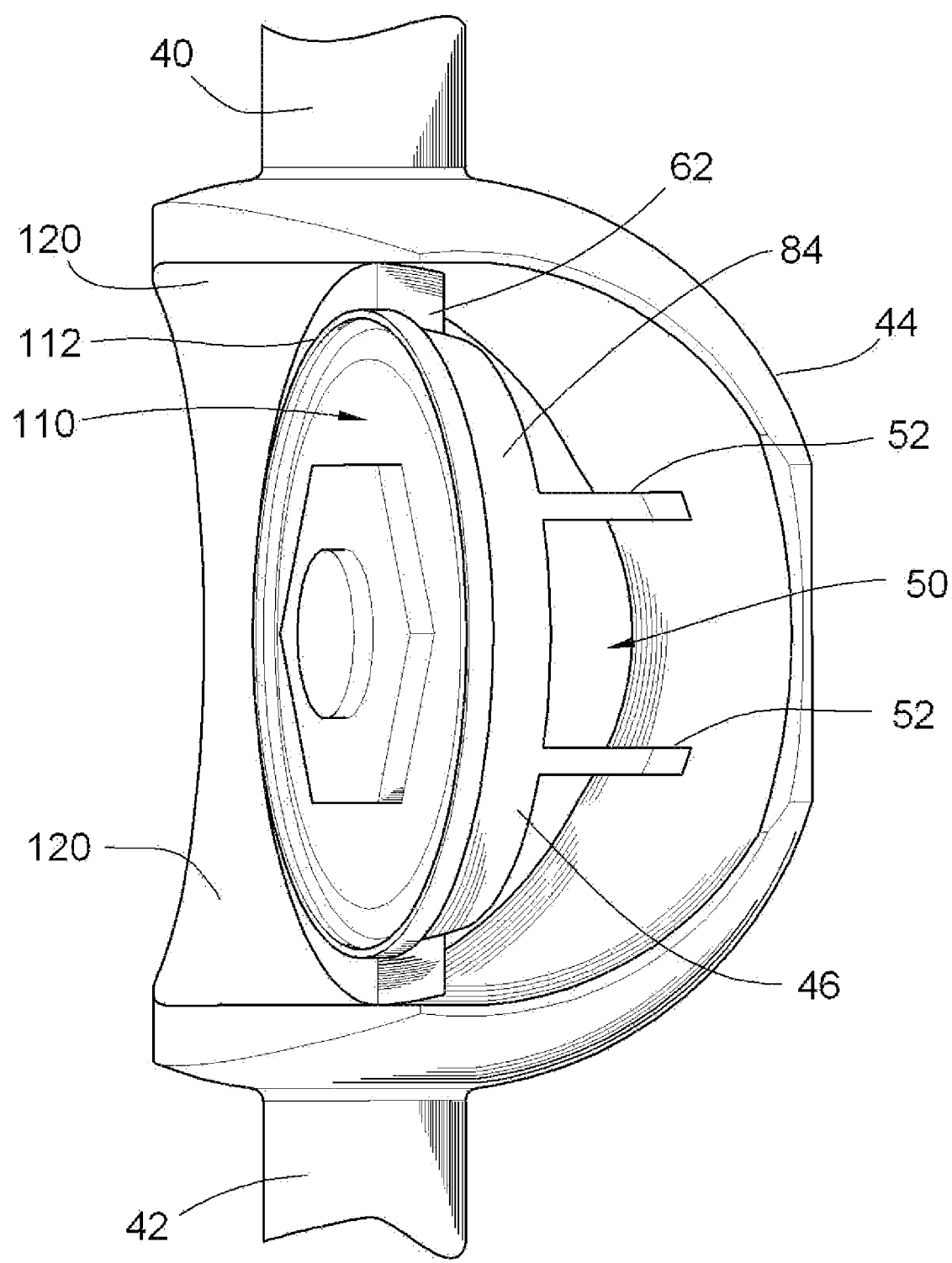
FIG. 8 is a partially cut-away rear perspective view of the butterfly valve of FIG. 1 with a solid plate and added material added to aid the flow gain function of the wedge or step.
Figure 9:
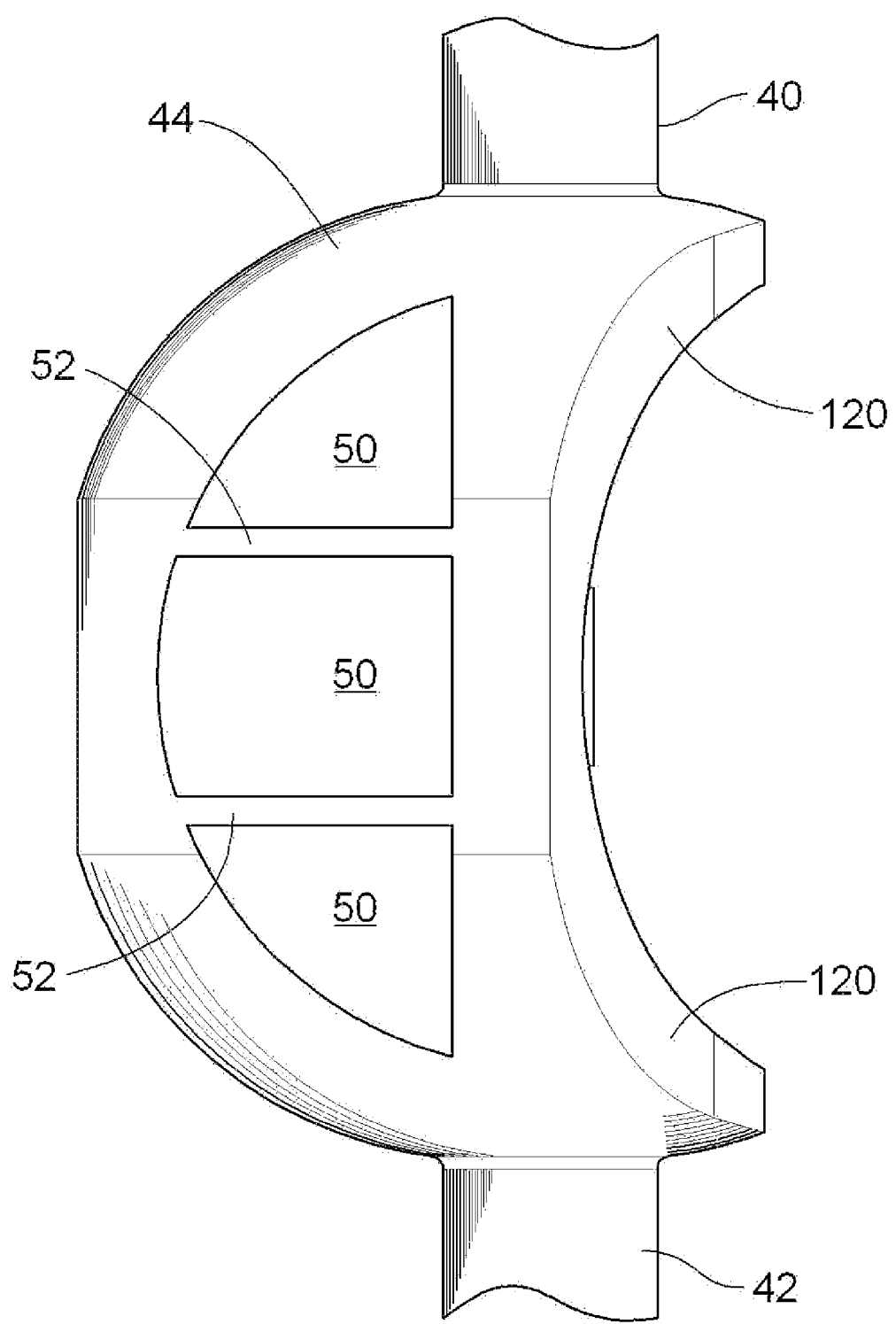
FIG. 9 is a side cross section view of the shaft assembly of FIG. 8.
Figure 10:
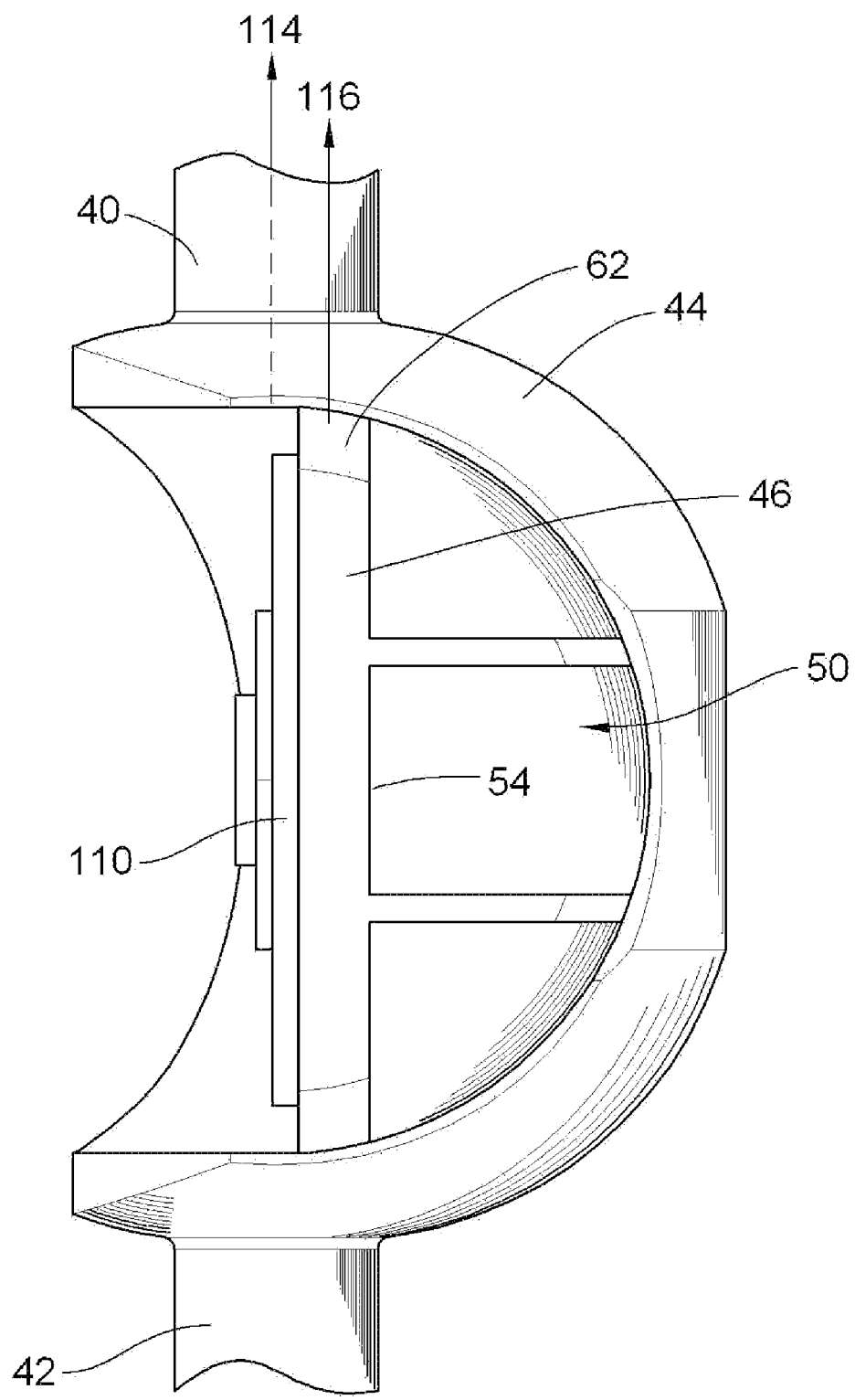
FIG. 10 is a side cross section view of the shaft assembly of FIG. 8 opposite of FIG. 9
Figure 11:
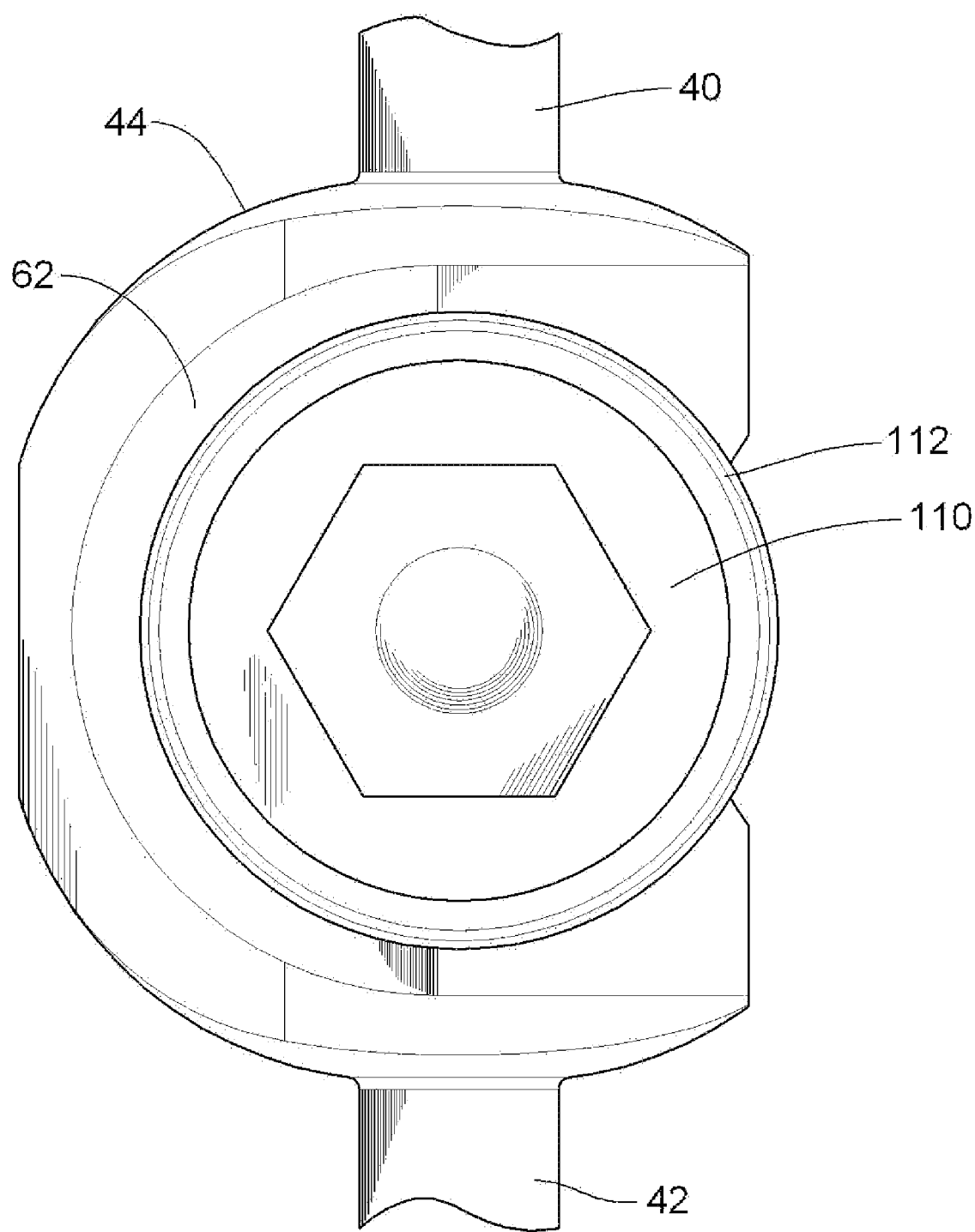
FIG. 11 is a front cross section view of the shaft assembly of FIG. 8.
Figure 12:
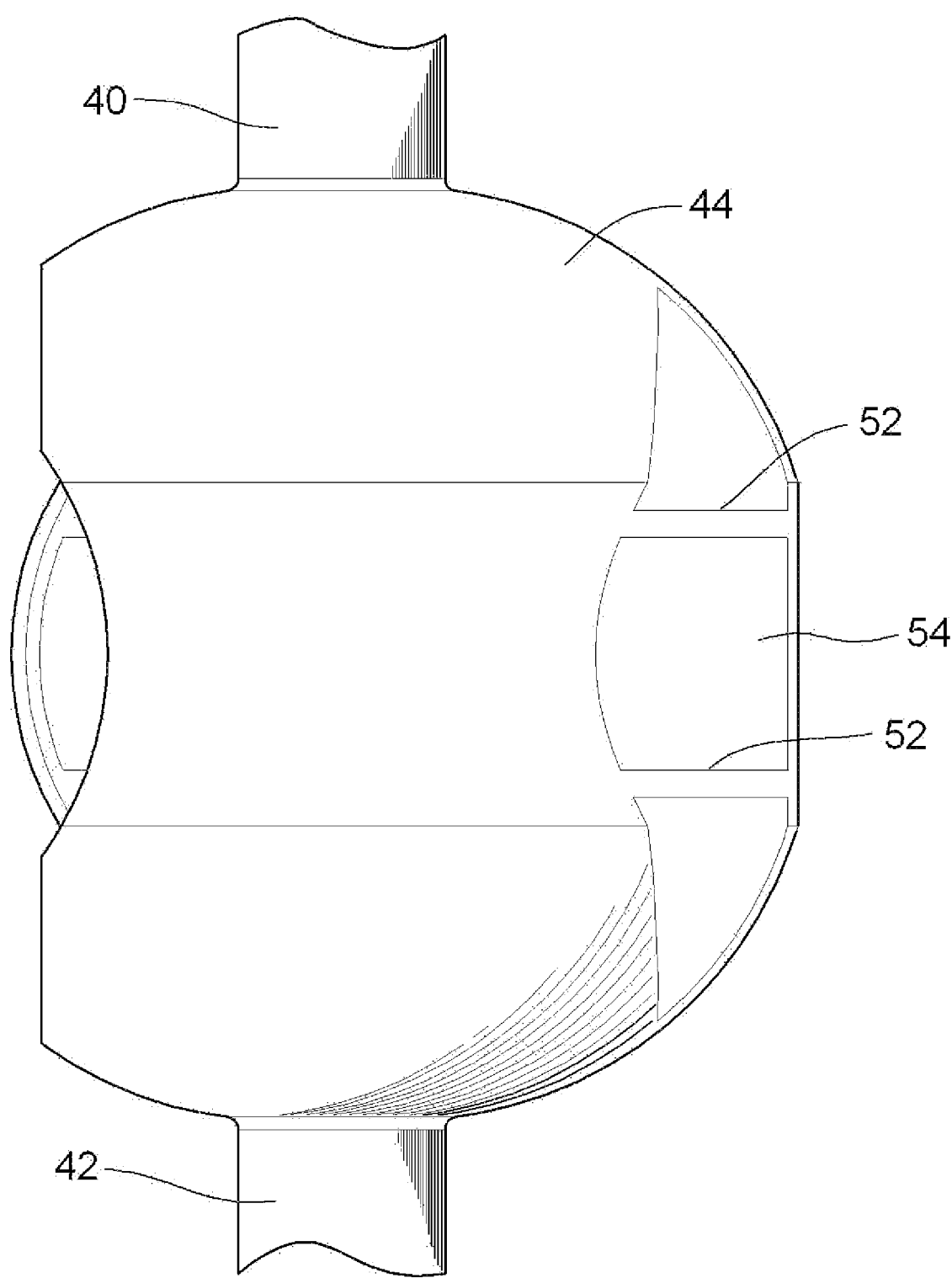
FIG. 12 is a rear view of the shaft assembly of FIG. 8.

In one embodiment, as shown in FIGS. 6 and 7, a wedge 90 is incorporated into the valve shaft assembly 14. The wedge 90 is used to reduce the flow area at low valve openings while still reaching a similar full flow area when the valve is fully open. While a wedge is shown, it can take the shape of a step and the like. In the description that follows, the wedge shall be used to describe this reduced flow mechanism. Those skilled in the art will recognize that mechanisms other than a wedge can be used such as a step and the like to achieve similar functionality. As shown, the wedge 90 is disposed against the plate 16 and operatively secured to the support plate 46. As such, a portion of the plate 16 is covered or hidden from view. The wedge 90 includes a plurality of apertures 92 such that the wedge can accommodate threaded members 80 (see FIG. 3). When threaded members 80 are driven inwardly into the recesses 64 of the support plate 46, the wedge 90 is forcibly engaged with the plate 16 and secured to the support plate 46. As best shown in FIG. 7, the wedge 90 include a notch 94 that prevents the flange 72 on the plate 16 and the wedge from contacting each other.

The wedge 90 provides the butterfly valve 10 with one or more benefits. For example, the wedge 90 allows even more precise metering of the fluid flowing through the butterfly valve 10 since the wedge will quickly begin entering the tube 18 when the actuator 48 begins closing the valve. In addition, the wedge 90 reduces the flow gain (i.e., rate of flow increase versus valve opening) when the valve 10 is almost in the closed position. Note that the flow path can move outward around the wedge 90 when the valve is open since the wedge 90 is beyond the end of the tube 18. As with the plate 16 and the tube 18, the wedge 90 is field replaceable without the need for removing the valve bonnet 36 from the valve body 12.

In a further embodiment, the plate 16 comprises a solid plate without a flange 72 with the plate being rigid in the radial direction. Turning now to FIGS. 8-12, the solid plate 110 has a lip 112. The lip 112 preferably projects and extends into the tube 18 such that the lip 112 is inside and engaged with the tube. In this arrangement, the lip 112 is seated against the tube 18 to encourage a seal. In the closed position, the fluid is prevented and/or restricted from flowing through the passage 30. In one embodiment, the plane of the outside edge of the 112 is coplanar to the rotating centerline 114 of the shaft assembly (ss FIG. 10) such that the shaft assembly centerline 114 bisects the lip edge. The compliance of the tube can allow the shaft assembly centerline 114 to be a very small distance from the plane 116 of the support plate 46. These offset dimensions can be used to change the torque induced by a pressure differential across the valve 10 at the fully closed position.

In one embodiment, the flow gain function of wedge 90 is aided or realized by adding material to the shaft assembly to partially fill the chamber 50 in the intermediate member 44. In another embodiment, the flow gain function of wedge 90 is aided or realized by adding material to the shaft assembly at a location near the wedge but outside of the tube 18 diameter. In a further embodiment, the flow induced torque is reduced by an order of magnitude over conventional butterfly valves by adding material to the shaft assembly at a location near the wedge but outside of the tube 18 diameter. The material at a location near the wedge in one embodiment is arcuate shaped extensions 120 on the outer body of the intermediate member 44.

From the foregoing, those skilled in the art will recognize that the butterfly valve 10 has significant advantages over known valves. For example, the butterfly valve 10 has a low seating torque due to the radial compliance of the tube 18 and the flange 72 on the plate 16. Since the radial compliance of the tube 18 and the flange 72 are matched in response to pressure differential across the valve 10, leakage is kept low in both the forward and reverse flow directions. Also, by allowing the tube 18 to be deflectable, the tube to plate wear is reduced, especially when the butterfly valve 10 oscillates in a partially or fully open position. In addition, since only a small blockage cross-sectional area formed by the thin support webs 52, the plate 16, and the support plate 46 remaining in the flow path, the butterfly valve 10 provides a higher flow area than other known types of high-pressure butterfly valves in both the forward and reverse flow directions.

The addition of surfaces on the shaft assembly 14 at locations external to the tube 18 with the valve 10 in the fully closed position means that a lower actuation torque is required compared to the actuation torque needed to open and close known valves having similar dimensions. The high fully open flow area or $C_v$ rating allows the use of smaller valve dimensions for a given flow rate and, hence, requires lower actuation torque due to the smaller valve dimensions. Further, since the tube 18 and the plate 16 are easily field replaceable without having to remove the valve bonnet 36, the butterfly valve 10 is particularly suited to applications where the wear rates of the tube and plate are high such as, for example, where a corrosive or eroding process fluid is being metered. Preferably, both the tube 18 and the plate 16 can be coated with protective material without excessive cost and are made from low cost materials so that they can be regularly replaced. The length of the tube 18 can be short enough such that the butterfly valve 10 may be packaged into a wafer type housing.

Further, as those skilled in the art will recognize, the valve shaft assembly 14 is configured such that it can be installed into a standard ball valve housing. In other words, the valve shaft assembly 14 and tube 18 can be retrofit into an existing ball valve with only minimal modifications to the ball valve housing. Preferably, the valve shaft assembly 14 has an increased stiffness when compared to conventional valves, which allows the butterfly valve 10 to operate at higher pressures for a given flow area rating compared to a conventional valve. Moreover, the lower contact forces between the tube 18 and the plate 16 allows for operation at higher temperatures without metal galling and seizure. Still further, uninterrupted diameters on the surfaces of the finished tube 18 and plate 16 in the local area of closed valve contact allow for much lower closed valve leakage rates than conventional butterfly valves.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A butterfly valve comprising:
   a valve body having a passage;
   a valve shaft assembly comprising a first shaft portion and a second shaft portion in opposing spaced relation, an intermediate portion between the first shaft portion and the second shaft portion, and a support plate secured to the valve shaft assembly, the first and second shaft portions rotatably coupling the valve shaft assembly to the valve body, the intermediate member forming a chamber in fluidic communication with the passage, the support plate disposed within the chamber at a closed valve position approximately perpendicular to a direction of fluid flow through the passage;
   a plate secured to the support plate, the plate having an inner portion and a flange radially outward of the inner portion, the flange directed away from the support plate; and a tube disposed within the passage, the tube being friction fit or clearance fit over a portion of the plate.

2. The butterfly valve of claim 1 wherein the tube starts at an attachment to the housing toward one end of the valve flow passage in a spaced relation to the shaft and extending to a location near the centerline of the shaft assembly.

3. The butterfly valve of claim 1, wherein the plate includes a tapered thickness section radially outward of the inner portion and radially inward of the flange.

4. The butterfly valve of claim 1, wherein the plate is rotatable about ninety degrees between a fully closed position and a fully open position.

5. The butterfly valve of claim 1, wherein the first and second shaft portions, the intermediate member, and the support plate of the valve shaft assembly are integrally formed.

6. The butterfly valve of claim 1, wherein the tube and the plate each have a radial deflection with respect to a forward and a reverse fuel pressure differential, the radial deflections of the tube and the flange approximately equivalent to each other.

7. The butterfly valve of claim 1, wherein a circular portion of the support plate has a radius that is less than a radius of the plate.

8. The butterfly valve of claim 1, wherein the valve shaft assembly further includes at least one support web interposed between the support plate and the intermediate member, the at least one support web integrally formed with the valve assembly.

9. The butterfly valve of claim 1, wherein the plate includes an aperture and the support plate includes a threaded recess, the plate secured to the support plate by a threaded member extending through the aperture and driven inwardly into the threaded recess.

10. The butterfly valve of claim 1, wherein the tube is deflectable such that the tube has an oval cross section transverse to a direction of fluid flow through the passage.

11. The butterfly valve of claim 1, wherein a reduced flow mechanism is secured to the valve shaft assembly.

12. The butterfly valve of claim 1, wherein the butterfly valve is operably coupled to an actuator, the actuator adapted to move the butterfly valve between an open position and a closed position.

13. The butterfly valve of claim 1, wherein the butterfly valve is operably coupled to a biasing member, the biasing member preloaded to move the butterfly valve to one of the open position and the closed position upon a loss of power to the actuator.

14. The butterfly valve of claim 1, wherein the butterfly valve has an equivalent flow area in both forward and reverse flow directions when the butterfly valve is in an open position.

15. The butterfly valve of claim 1, wherein at least one of the tube and the circular plate are provided with a coating.

16. The butterfly valve of claim 1, wherein the shaft assembly has material at a location outside of the tube diameter when the valve is in the fully closed position.

17. The butterfly valve of claim 1, wherein the shaft assembly has material located in and blocking a portion of the chamber within the shaft assembly.

18. The butterfly valve of claim 1, wherein the rotation centerline of the shaft is coplanar with the OD of the plate protuberance.

19. The butterfly valve of claim 1, wherein the rotation centerline of the shaft bisects the OD of the plate protuberance.

20. The butterfly valve of claim 1, wherein the rotation centerline of the shaft is not coplanar with the OD of the plate protuberance.

21. The butterfly valve of claim 1, wherein the rotation centerline of the shaft does not bisect the OD of the plate protuberance.

22. The butterfly valve of claim 1, wherein the flange is directed toward the support plate.

23. A butterfly valve comprising:
a valve body forming a passage, a shaft aperture, and a recess, the shaft aperture transverse to the passage and in opposing spaced relation with and axially aligned with the recess;
a valve shaft assembly including a first shaft portion and a second shaft portion in opposing spaced relation, an intermediate member, and a support plate, the first shaft portion rotatably extending into the shaft aperture and the second shaft portion rotatably situated within the recess, the intermediate member disposed between the first and second shaft portions and forming a chamber in fluidic communication with the passage, the support plate disposed within the chamber at a closed valve position approximately perpendicular to a direction of fluid flow through the passage;
a plate secured to the support plate, the plate having a inner portion and a flange radially outward of the inner portion, the flange directed away from the support plate; and
a tube disposed within the passage, the tube friction fit with the passage or fastened to the passage and friction fit over at least a portion of the flange;
wherein a rounded portion of the support plate and a corresponding portion of the plate are rotatable into the tube to place the valve in an open position and rotatable to a location at an end of the tube to place the valve in a closed position.

24. The butterfly valve of claim 23, wherein the tube and the plate are replaceable without removing the valve bonnet from the valve body.

25. The butterfly valve of claim 23, wherein at least one of the tube and the circular plate are provided with at least one of an erosion resistant coating and a corrosion resistant coating.

26. The butterfly valve of claim 23, wherein the plate is secured to the support plate by at least one threaded member and the tube and the plate are equivalently radially deflectable in a forward flow direction and equivalently radially deflectable in a reverse flow direction.

27. The butterfly valve of claim 23, wherein an end of the tube terminates proximate a centerline of the first and second shaft portions.

28. A butterfly valve shaft assembly for use with a ball valve housing, the butterfly valve shaft assembly comprising:
a first shaft portion;
a second shaft portion in opposing spaced relation with the first shaft portion;
an intermediate member between the first and second shaft portions and having a chamber passing therethrough;
a support plate disposed within the chamber at a closed valve position approximately perpendicular to a direction of fluid flow through the passage; and
a plate secured to the support plate, the plate having an inner portion and a flange radially outward of the inner portion, the flange directed one of away from or toward the support plate; and
a tube disposed within the passage, the tube being friction fit or clearance fit over a portion of the plate.

29. The butterfly valve shaft assembly of claim 28, wherein the flange includes a protuberance projecting radially outwardly, the protuberance progressing circumferentially around the flange, and wherein a tube is one of friction fit and clearance fit over at least a portion of the protuberance.

30. The butterfly valve shaft assembly of claim 28 wherein the ball valve housing has a passage, the butterfly valve shaft assembly further comprising a tube adapted to be disposed within the passage, the tube friction fit or clearance fit over at least a portion of the flange.

31. The butterfly valve shaft assembly of claim 30, wherein the tube is cylindrical and at least one of the support plate and the plate is oval, the tube deflectable such that the tube has an oval cross section transverse to a direction of fluid flow through the passage.

32. The butterfly valve shaft assembly of claim 30, wherein at least one of the tube and the plate is rigid in a radial direction when at least one of a low closed valve actuator force or a tight shutoff are not needed.

33. The butterfly valve shaft assembly of claim 28, wherein the plate and the support plate are integrally formed with each other.

34. A butterfly valve comprising:
- a valve body having a passage;
- a valve shaft assembly comprising a first shaft portion and a second shaft portion in opposing spaced relation, an intermediate portion between the first shaft portion and the second shaft portion, and a support plate secured to the valve shaft assembly, the first and second shaft portions rotatably coupling the valve shaft assembly to the valve body, the intermediate member forming a chamber in fluidic communication with the passage, the support plate disposed within the chamber at a closed valve position approximately perpendicular to a direction of fluid flow through the passage;
- a plate secured to the support plate, the plate having a rigid portion in the radial direction, the plate having an inner portion and a flange radially outward of the inner portion, the flange directed one of away from or toward the support plate; and
- a tube disposed within the passage, the tube friction fit or clearance fit over at least a portion of the plate.

* * * * *